(12) United States Patent
Goossens

(10) Patent No.: US 10,208,812 B2
(45) Date of Patent: Feb. 19, 2019

(54) METHOD AND SYSTEM FOR UNLOCKING AN ELECTROMAGNETIC ACTUATOR

(71) Applicant: DANA AUTOMOTIVE SYSTEMS GROUP, LLC, Maumee, OH (US)

(72) Inventor: Stijn Goossens, Erpe-Mere (BE)

(*) Notice: Subject to any disclaimer, the term of this patent is extended or adjusted under 35 U.S.C. 154(b) by 0 days.

(21) Appl. No.: 15/527,081

(22) PCT Filed: Nov. 19, 2015

(86) PCT No.: PCT/US2015/061617
§ 371 (c)(1),
(2) Date: May 16, 2017

(87) PCT Pub. No.: WO2016/081741
PCT Pub. Date: May 26, 2016

(65) Prior Publication Data
US 2017/0363158 A1    Dec. 21, 2017

Related U.S. Application Data

(60) Provisional application No. 62/081,962, filed on Nov. 19, 2014.

(51) Int. Cl.
*F16D 27/108* (2006.01)
*F16D 11/10* (2006.01)
(Continued)

(52) U.S. Cl.
CPC ............ *F16D 27/108* (2013.01); *B60K 17/02* (2013.01); *B60K 17/34* (2013.01); *F16D 11/10* (2013.01);
(Continued)

(58) Field of Classification Search
CPC .... F16D 27/108; F16D 48/064; F16D 27/118; F16D 11/10; F16D 2011/002; H01F 7/10;
(Continued)

(56) References Cited

U.S. PATENT DOCUMENTS

| 721,678 A | 3/1903 | Douglas |
| 3,421,784 A | 1/1969 | Paterson |

(Continued)

OTHER PUBLICATIONS

European Patent Office, The nternational Search Report and the Written Opinion, issued in PCT/US2015/061617, dated Feb. 1, 2016, 13 pages, European Patent Office, Rijswijk, Netherlands.

*Primary Examiner* — David J Hlavka
(74) *Attorney, Agent, or Firm* — Marshall & Melhorn, LLC

(57) ABSTRACT

A method of disengaging an axle disconnect system including providing an actuator having a coil (214) at least partially surrounded by a housing (220), an armature (216) located within the housing and the coil, where the armature is capable of actuating between a first and second position, and at least one of the housing and the armature is part of a magnetic circuit. Applying a current to the coil and actuating the armature from the first position to the second position. Developing an uninterrupted magnetic flux through the magnetic circuit and stopping application of the current to the coil. Permitting the magnetic flux through the magnetic circuit to continue in its uninterrupted state and maintain the armature in the second position. Applying an alternating current, having decreasing amplitude over time, to the coil to dissipate the magnetic flux through the magnetic circuit.

15 Claims, 6 Drawing Sheets

(51) Int. Cl.
*B60K 17/02* (2006.01)
*B60K 17/34* (2006.01)
*F16D 27/118* (2006.01)
*F16D 48/06* (2006.01)
*H01F 7/06* (2006.01)
*H01F 7/10* (2006.01)
*H01F 7/16* (2006.01)
*F16D 11/00* (2006.01)

(52) U.S. Cl.
CPC .......... *F16D 27/118* (2013.01); *F16D 48/064* (2013.01); *H01F 7/064* (2013.01); *H01F 7/10* (2013.01); *H01F 7/1607* (2013.01); *F16D 2011/002* (2013.01)

(58) Field of Classification Search
CPC ....... H01F 7/064; H01F 7/1607; B60K 17/02; B60K 17/34
See application file for complete search history.

(56) References Cited

U.S. PATENT DOCUMENTS

| | | |
|---|---|---|
| 4,337,855 A | 7/1982 | Bennett |
| 5,185,542 A | 2/1993 | Lazorchak |
| 5,732,605 A | 3/1998 | Mann |
| 5,825,604 A | 10/1998 | Ikeda et al. |
| 6,471,017 B1 | 10/2002 | Booz et al. |
| 8,403,124 B2 | 3/2013 | Dimig et al. |
| 8,522,943 B2 | 9/2013 | Tate, Jr. et al. |
| 2007/0175694 A1* | 8/2007 | Fort .................... B60G 21/0555 180/337 |
| 2012/0228076 A1* | 9/2012 | Tate, Jr. ................ F16D 27/118 192/66.1 |
| 2013/0201591 A1 | 8/2013 | Dimig et al. |
| 2015/0308518 A1* | 10/2015 | Stocker .................. F16D 11/16 192/69.6 |
| 2015/0380144 A1* | 12/2015 | Heravi .................. F16D 48/064 361/139 |
| 2016/0348740 A1* | 12/2016 | Kitayama ............. F16D 27/108 |
| 2018/0094677 A1* | 4/2018 | Cioc ....................... F16D 41/16 |

* cited by examiner

METHOD AND SYSTEM FOR UNLOCKING AN ELECTROMAGNETIC ACTUATOR

RELATED APPLICATIONS

The present application claims the benefit to U.S. Provisional Patent Application No. 62/081,962 filed on Nov. 19, 2014, and to PCT/US2015/061617 filed on Nov. 19, 2015, each of which is incorporated herein by reference in its entirety.

BACKGROUND

All-wheel drive capable vehicles have many advantages over vehicles having a driveline connected to only a single axle. Specifically, all-wheel drive capable vehicles have increased traction and enhanced drivability over similar vehicles that are driven using only a single axle.

However, traditional all-wheel drive vehicles are disadvantaged by requiring continuous rotation of a second drive axle, and other portions of the driveline, at road speed, even when the all-wheel drive functionality is not beneficial. Consequently, traditional all-wheel drive vehicles tend to have reduced fuel, and overall, efficiency when compared to vehicles having only a single drive axle.

All-wheel drive vehicles incorporating a secondary driveline disconnect feature are being developed. In such vehicles, when a control system detects that all-wheel drive functionality is not required, the control system disconnects the second drive axle (and other associated driveline components) to place the driveline into a single axle drive mode. Once the second drive axle is disconnected, there is no transfer of torque to the second drive axle. As a result, speed-dependent losses associated with the second drive axle (and other associated driveline components) are eliminated by allowing the second drive axle (and other associated driveline components) to remain in an idle condition.

Secondary driveline disconnect systems may utilize an electromagnetic actuator to perform an engagement and a disengagement of the secondary driveline. Remanent magnetization may be utilized to place the electromagnetic actuator in a stable state without the application of current thereto. However, removing the remanent magnetization in a consistent and predictable manner using conventional methods may be affected by many operational variables, such as but not limited to, temperature, manufacturing tolerances, and part variation.

The disclosure herein describes a method and system for consistently and efficiently connecting and disconnecting an electromagnetic actuator.

SUMMARY

According to an embodiment of the present subject matter, the present disclosure provides a method of disengaging an axle disconnect system. The method of disengaging an axle disconnect system comprises providing an actuator. The actuator comprises a coil having a plurality of copper windings, a housing at least partially surrounding the coil, an armature slideably disposed within the housing and the coil, the actuator including a first and second axial position of the armature, and a magnetic circuit comprising at least one of the housing and the armature.

The method of disengaging an axle disconnect system also comprises applying a current to the coil, actuating the armature from the first axial position to the second axial position, and developing an uninterrupted magnetic flux through the magnetic circuit. The method of disengaging an axle disconnect system additionally comprises ceasing flow of the current to the coil, permitting the magnetic flux through the magnetic circuit to remain uninterrupted, and maintaining the armature in the second axial position. In addition, the method of disengaging an axle disconnect system comprises applying an alternating current having decreasing amplitude over time to the coil such that the magnetic flux through the magnetic circuit is substantially dissipated.

According to another embodiment of the present subject matter, the present disclosure provides a method of disengaging an axle disconnect system. The method of disengaging an axle disconnect system comprises providing an actuator. The actuator comprises a coil having a plurality of copper windings, a housing at least partially surrounding the coil, an armature slideably disposed within the housing and the coil, a control unit in electrical communication with the coil, and an electrical circuit in electrical communication with the control unit.

The electrical circuit comprises a power source, a capacitor, a resistor in electrical communication with the capacitor and the power source, a diode, a first switch selectively placing the power source in electrical communication with the coil, and a second switch selectively placing the coil in electrical communication with the capacitor, and selectively placing the coil in electrical communication with the diode.

The actuator includes a first and second axial position of the armature. The actuator also has a magnetic circuit comprising at least one of the housing and the armature, a first clutch module operatively engaged with the armature, a second clutch module disposed axially adjacent to the first clutch module for selective operative engagement with the first clutch module, and a biasing member operatively coupled with the first clutch module and the second clutch module.

The method of disengaging an axle disconnect system additionally comprises applying a current to the coil by closing the electrical circuit first switch, placing the power source in electrical communication with the coil, and actuating the armature from the first axial position to the second axial position, thereby operatively driving the first clutch module into operative engagement with the second clutch module, and loading the biasing member in a compressed state operatively between the first clutch module and the second clutch module. The method further comprises developing an uninterrupted magnetic flux through the magnetic circuit, ceasing flow of the current to the coil by closing the second switch to place the coil in electrical communication with the diode, and opening the first switch. The method also comprises permitting the magnetic flux through the magnetic circuit to remain uninterrupted, maintaining the armature in the second axial position, and closing the second switch placing the capacitor in electrical communication with the coil, thereby applying an alternating current having decreasing amplitude over time to the coil such that the magnetic flux through the magnetic circuit is substantially dissipated, permitting the biasing member to decompress and operatively disengage the first clutch module and the second clutch module.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION OF EMBODIMENTS

Figure 1:
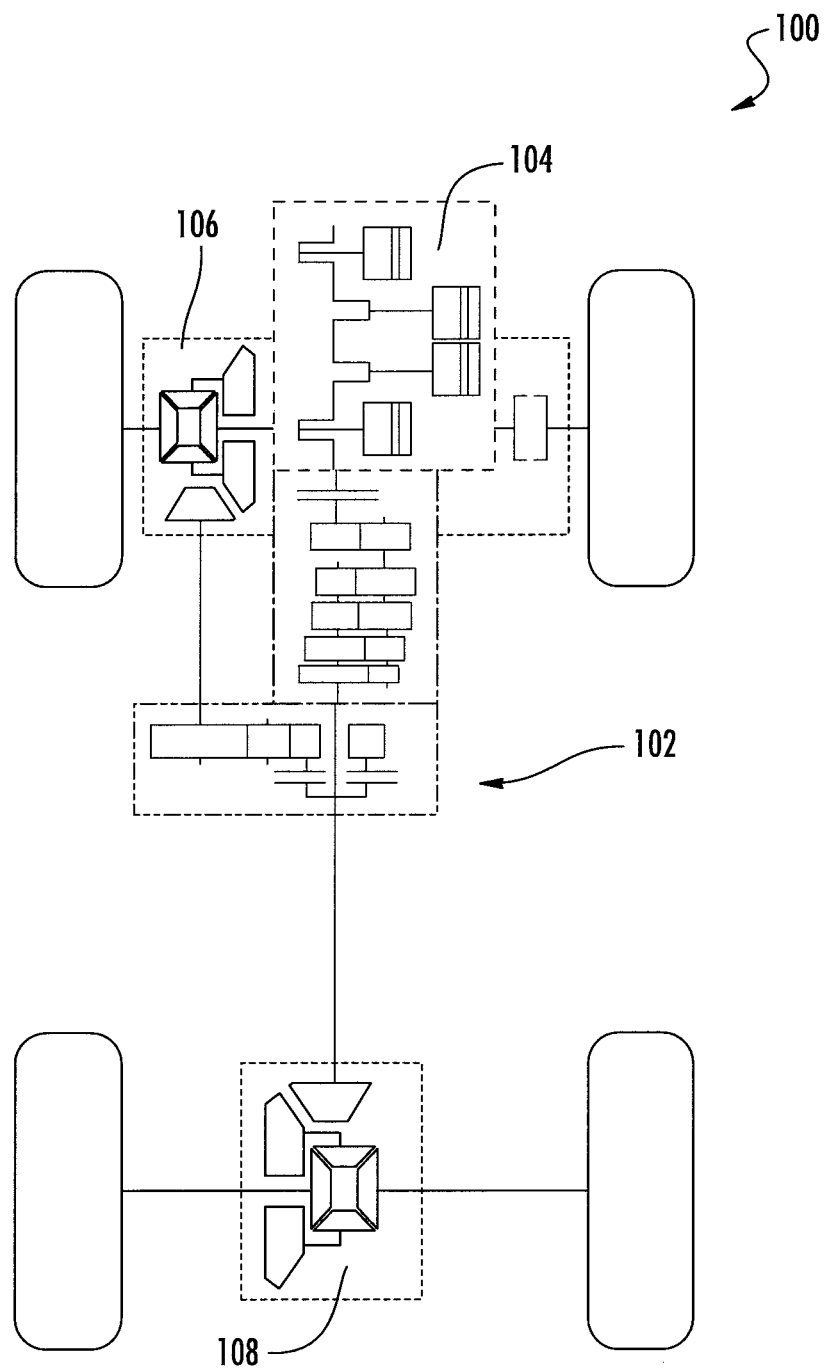
FIG. 1 is a schematic diagram of a portion of a portion of an automobile driveline having primary and secondary wheel sets according to an embodiment of the presently disclosed subject matter.

It is to be understood that the presently disclosed subject matter may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Certain embodiments of a driveline disconnect system 200 are utilized with an all-wheel-drive ("AWD") driveline assembly. However, the driveline disconnect apparatus 200 is not limited to use with the driveline assemblies described herein. The driveline disconnect apparatus 200 may be utilized with, but is not limited to, driveline assemblies of other shapes, sizes, orientations, and designs in automobiles and manufacturing equipment.

FIG. 1 illustrates an embodiment of the presently disclosed subject matter wherein a vehicle 100 includes a driveline 102 having all-wheel drive functionality. The driveline 102 comprises a power source 104, a final drive unit 106, and a rear drive unit 108. The driveline 102 further includes a driveline disconnect system 200.

Figure 2:
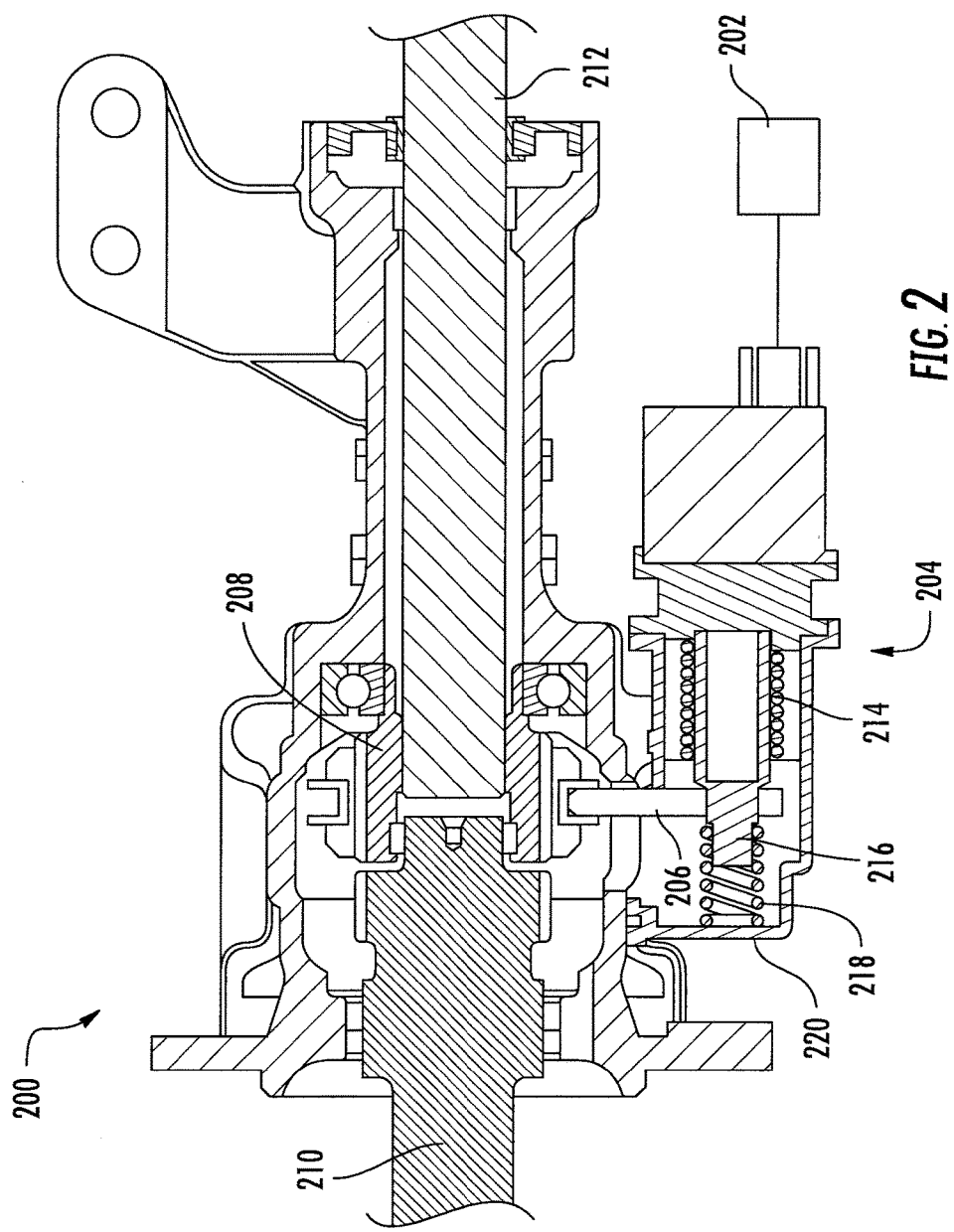
FIG. 2 is a cross-section of a portion of an electromagnetic rapid disconnect apparatus according to an embodiment of the presently disclosed subject matter.

As illustrated in FIG. 2, in an embodiment, the driveline disconnect system 200 comprises a control unit 202, an electromagnetic actuator 204, a clutch fork 206, and a dog-clutch 208. The control unit 202 is in communication with the electromagnetic actuator 204. The electromagnetic actuator 204 is driveably connected to the clutch fork 206, which is drivingly connected with the dog-clutch 208.

The control unit 202 may execute a series of instructions in response to a command by a vehicle operator, data received from a vehicle controller (not shown), or data received from at least one sensor, or a combination thereof.

It is understood that the series of instructions executed by the control unit 202 may be stored on a portion of the control unit 202 or on a device (not shown) in communication with the control unit 202. The control unit 202 is in communication with the electromagnetic actuator 204 to place the electromagnetic actuator 204 into the engaged position and to perform a degaussing of the electromagnetic actuator 204.

The electromagnetic actuator 204 comprises a housing 220, a coil 214, an armature 216, and a biasing member 218. In response to a current from the control unit 202 supplied to the coil 214, the coil 214 is energized, creating a magnetic field. The magnetic field causes the armature 216 to actuate and compress the biasing member 218. The clutch fork 206 is also driven by the movement of the armature 216, and the clutch fork 206 actuates the dog-clutch 208. The dog-clutch 208 then becomes drivingly engaged with the driving part 210 and the driven part 212. When the current from the control unit 202 to the coil 214 is interrupted, the dog-clutch 208 remains drivingly engaged because of the residual magnetism of the armature 216.

In addition to the actuation sequence described above, the electromagnetic actuator 204 uses a remanent field to maintain the engaged position of the electromagnetic actuator 204. The remanent field facilitates maintaining the electromagnetic actuator 204 in the engaged position without application of electrical current by the control unit 202. The remanent field may be generated in the coil 214 or in any ferrous portion of the electromagnetic actuator 204. In addition to using a remanent field to maintain the engaged position of the electromagnetic actuator 204, the electromagnetic actuator 204 may also incorporate the use of permanent magnets to maintain the engaged position of the electromagnetic actuator 204. It is to be understood that such principles may also be applied to a variation of the present subject matter in which a remanent field facilitates maintaining an electromagnetic actuator in a disengaged position without application of electrical current.

In an embodiment, to disengage the dog-clutch 208, or aid therein, the remanent field is dissipated. Upon dissipation of the remanent field, the armature 216 is capable of axial movement, and the biasing member 218 drives the armature 216 to a disengaged position. In response to the actuation of the armature 216, the dog-clutch 208 becomes drivingly disengaged from the driving part 210 and the driven part 212.

Figure 3:
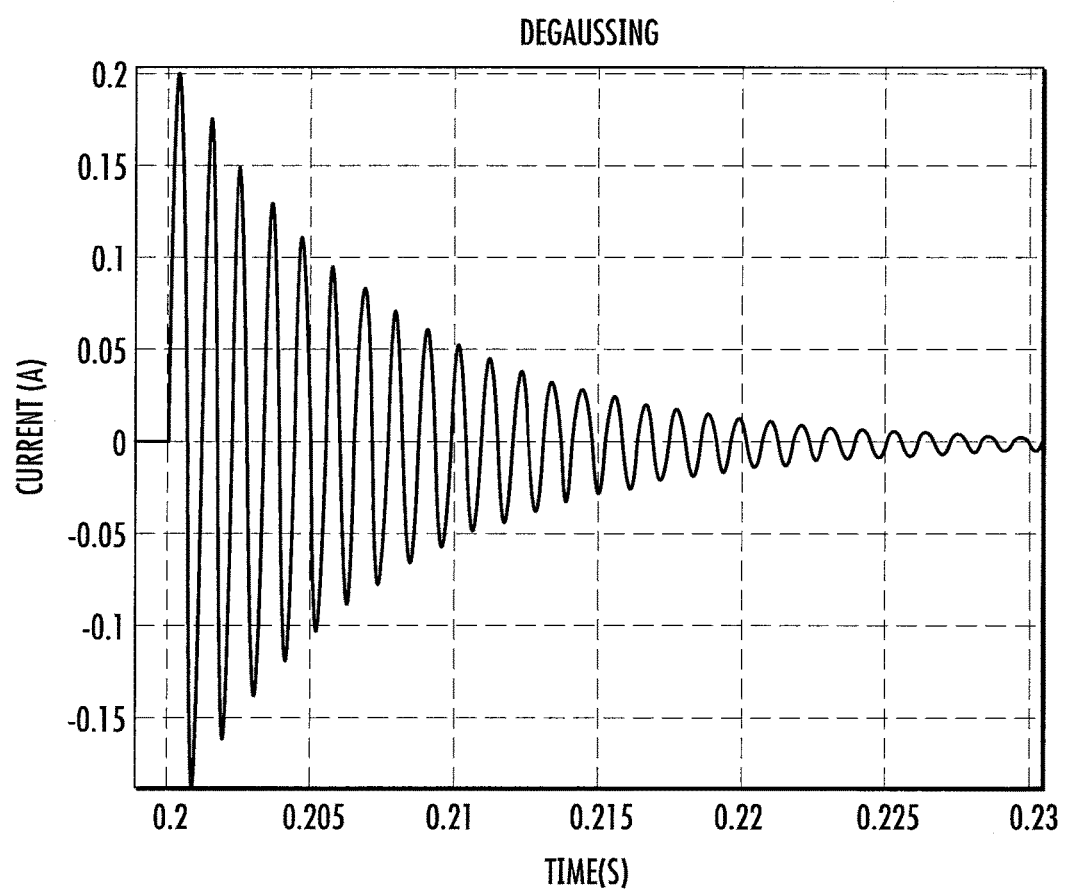
FIG. 3 is a graph of a decaying sine-wave having exponentially decreasing amplitude according to an embodiment of the presently disclosed subject matter.
Figure 4:
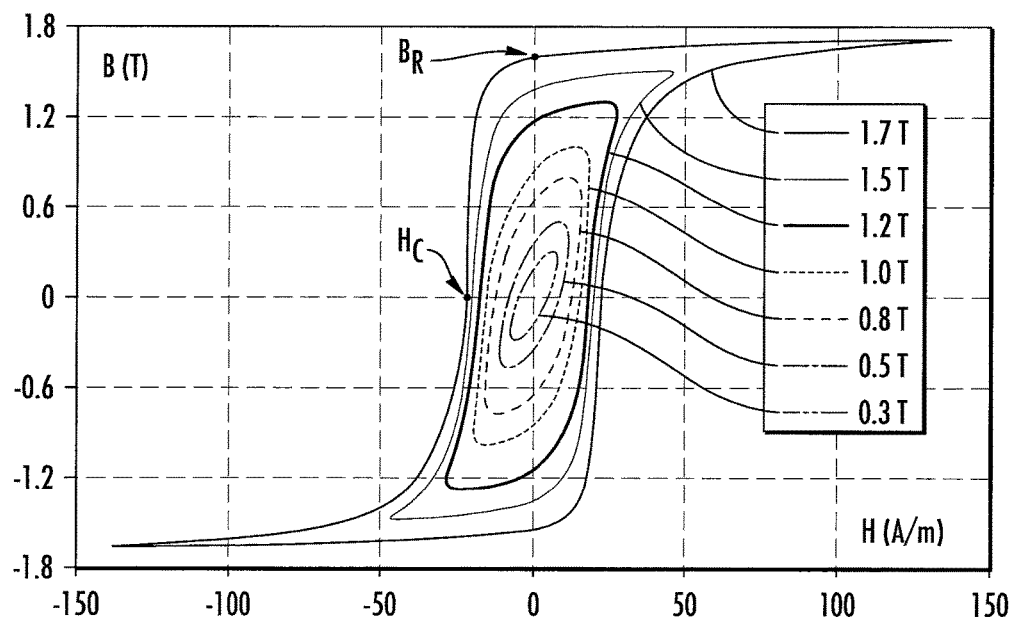
FIG. 4 is a graph of a series of hysteresis curves illustrating a degaussing process according to an embodiment of the presently disclosed subject matter.

The control unit 202 dissipates the remanent field by performing a degaussing process on the coil 214 or the ferrous portion of the electromagnetic actuator 204 in which the remanent field resides. The degaussing process at least partially dissipates the remanent field from the electromagnetic actuator 204 by applying an alternating current, having decreasing amplitude, to the coil 214. An example of the alternating current utilized in a degaussing process is shown in FIG. 3. The alternating current illustrated in FIG. 3 is an exponentially decaying sine-wave. Application of an alternating current having decreasing amplitude to the coil 214 causes the remanent field of the electromagnetic actuator 204 to experience successively smaller hysteresis curves. An example of a family of hysteresis curves characteristic of the dissipation of the remanent field is illustrated in FIG. 4. In FIG. 4, the notation "BR" represents flux density, the notation "HC" represents coercivtiy, and the notation "T" denotes the unit of measurement the tesla. During the degaussing process the remanent field is dissipated at least until the biasing member 218 is able to overcome the force(s) of the magnetic field of the electromagnetic actuator 204 and drive the armature 216 to a disengaged position. The degaussing process applied to the electromagnetic actuator 204 provides a robust and efficient procedure to disengage the dog-clutch 208.

The control unit 202 can perform the degaussing process in one of a plurality of ways. As non-limiting examples, the control unit 202 may perform the degaussing process using a digital control or an analog circuit. The digital control may comprise, but is not limited to, a 555 timer IC. The control unit 202 may comprise a circuit having a digital current source inverter.

Figure 5:
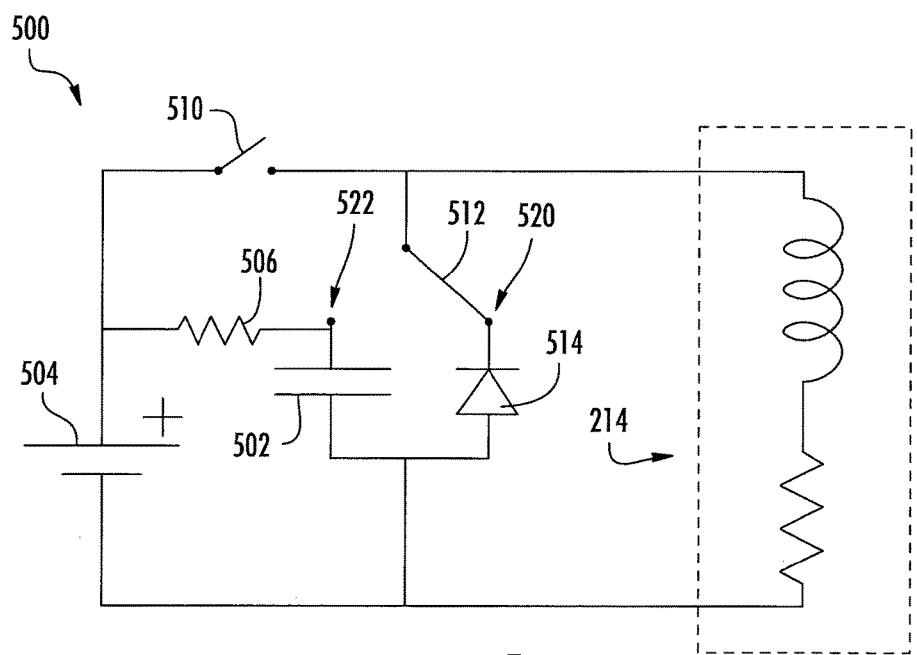
FIG. 5 is a schematic diagram of a circuit according to an embodiment of the presently disclosed subject matter.

A circuit 500 that may be utilized by the control unit 202 to perform the degaussing process described herein supra is illustrated in FIG. 5. In an embodiment, the circuit 500 may form a portion of the control unit 202 or may be integrated into a portion of the electromagnetic actuator 204. In other embodiments, the circuit 500 may be configured in other arrangements that may perform the degaussing process. In an embodiment, the circuit 500 comprises a capacitor 502, a power supply 504, a resistor 506, a first switch 510, a second switch 512, a diode 514, and the coil 214. The circuit 500 supplies a current to the electromagnetic actuator 204 when the second switch 512 is closed to a first point 520, and the first switch 510 is closed. The electromagnetic actuator 204 remains engaged when the circuit 500 first switch 510 is opened, and no current is supplied to the coil 214. The circuit 500 dissipates the remanent field of the electromagnetic actuator 204 via the degaussing process by closing the second switch 512 to a second point 522 while the first switch 510 is opened; the capacitor 502, starting at a voltage of the power supply 204, then applies a decaying alternating current to the coil 214.

In another embodiment, any circuit comprising the ability to engage the electromagnetic actuator 204 via controlling a current through the coil 214, hold the electromagnetic actuator 204 in a state of engagement without the application of current to the coil 214, and apply a current to the coil 214 that causes the degaussing process, may be utilized by the control unit 202. Additionally, together in another embodiment, or in separate embodiments, the circuit 500 may be modified to use a different mechanism to charge the capacitor 502, add a switch in series with the resistor 506 for charging the capacitor 502, and use a digitally controlled charging circuit that includes a power electronics topology. Furthermore, the first switch 510 may comprise a high frequency switch.

Figure 6:
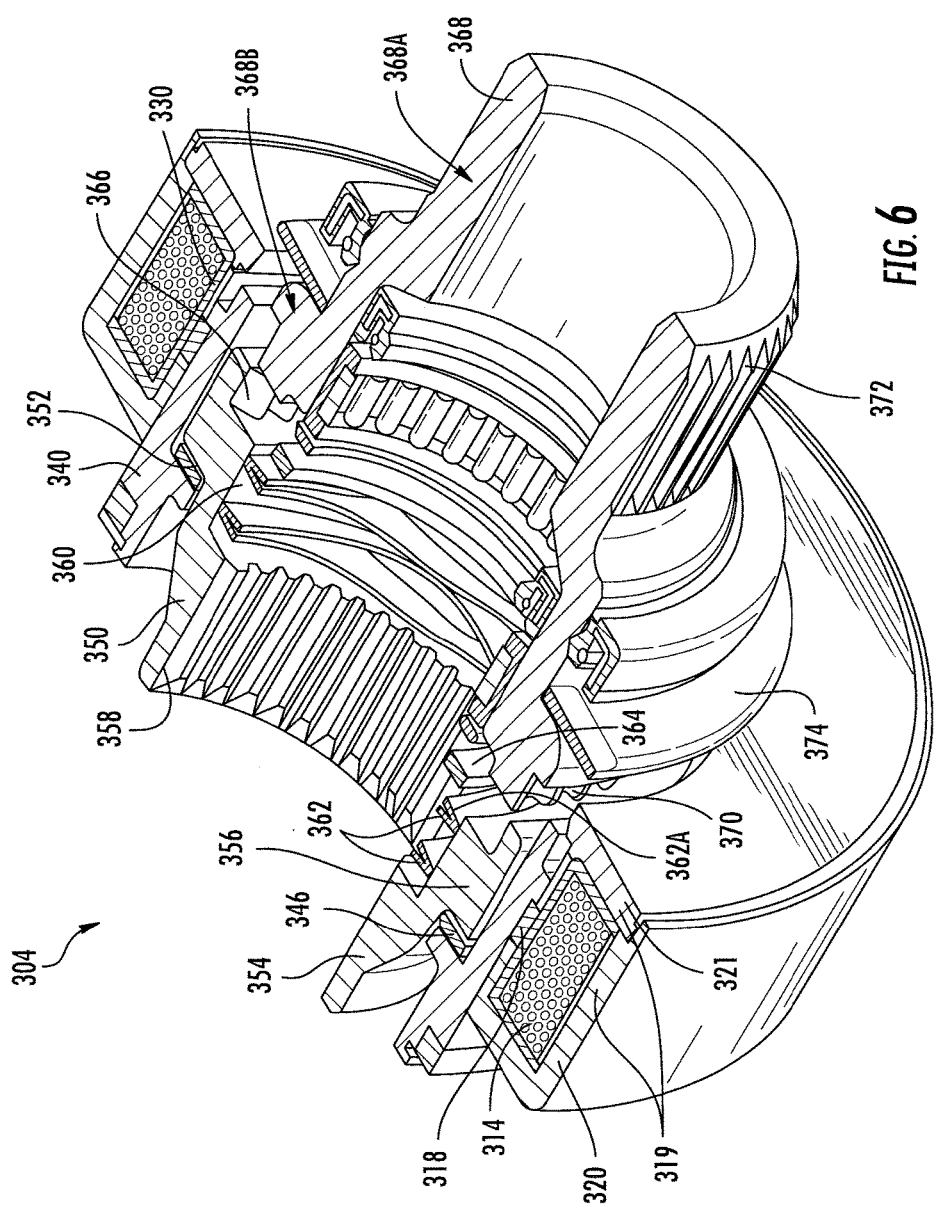
FIG. 6 is perspective view cross-section of a portion of an electromagnetic rapid disconnect apparatus according to an embodiment of the presently disclosed subject matter.
Figure 7:
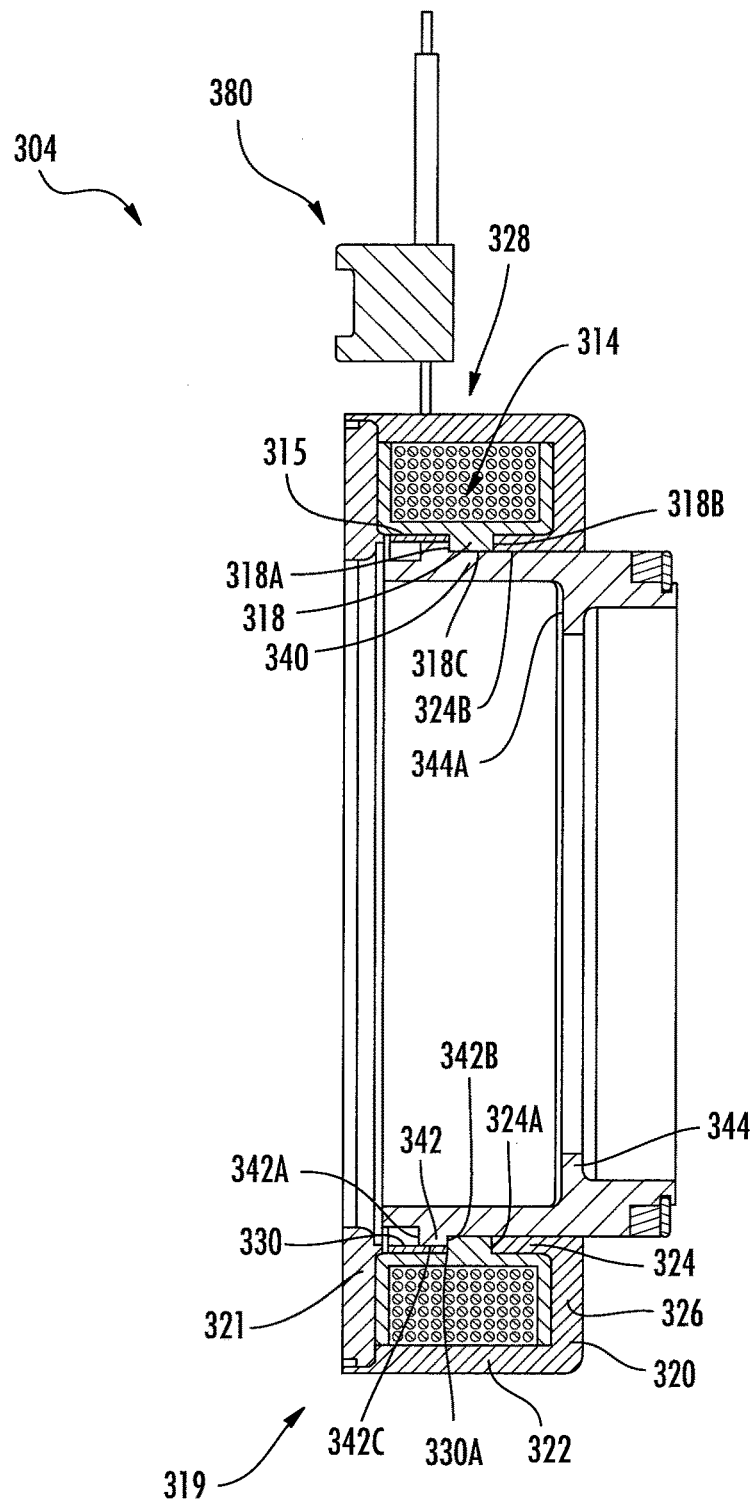
FIG. 7 is a cross-section of the electromagnetic rapid disconnect apparatus according to FIG. 6.

As illustrated in FIGS. 6 and 7, in an embodiment, the electromagnetic actuator 304 comprises a housing assembly 319 including a substantially annular housing 320 and an annular housing plate 321. The annular housing 320 may be a unitary module comprising, but not limited to, a U-shaped or a J-shaped cross-section. The housing 320 includes an annular exterior wall 322 and an annular interior wall 324 connected via a discoid base 326, the base 326 having a bore therethrough defined by the interior wall 324. A coil assembly 314 is disposed in the interior of the housing 320, the housing 320 interior being defined by the exterior wall 322, the interior wall 324, and the base 326. The housing 32Q exterior wall 322 also defines an aperture 328 that permits an electrical coupling 380 between the coil assembly 314 and a control unit (not depicted).

The coil assembly 314 comprises multiple wire windings and a potting material, together having a substantially annular geometry. A radial protrusion 318 is disposed on an interior surface 315 of the coil assembly 314. The protrusion 318 comprises a first surface 318A and a second surface 318B. When the electromagnetic actuator 304 is assembled, the second surface 318B is substantially contiguous with or touching an end surface 324A of the housing 320 interior wall 324. The protrusion 318 projects inward from the coil assembly 314 interior surface 315 such that a third surface 318C of the protrusion 318 is substantially level with the plane of the interior surface 324B of the housing 320 interior wall 324.

An annular sleeve 330 is disposed on, and concentric with, the interior surface 315 of the coil assembly 314. A first surface 330A of the sleeve 330 is disposed substantially tangential to the first surface 318A of the coil assembly protrusion 318. In addition, the annular sleeve 330 comprises a thickness between its outer diameter and inner diameter which is less than the distance which the protrusion 318 projects radially-inward from the coil assembly 314 interior surface 315.

Furthermore, a generally annular and cylindrical armature 340 is slideably disposed on the interior surface 324B of the housing 320 and the third surface 318C of the coil assembly 314 projection 318. The armature 340 comprises an outward-radial projection 342 having a first surface 342A, a second surface 342B, and a third surface 342C. The third surface 342C of the armature projection 342 is slideably disposed against the inner diameter of the sleeve 330. The armature 340 also comprises an inward-radial projection 344 having a first surface 344A. Situated axially adjacent the first surface 344A is an annular bushing 346 concentrically disposed inside the armature 340. A magnetic circuit may be formed by at least one of the housing assembly 319, the housing 320, and the armature 340 when a current is applied to the coil assembly 314.

A first clutch module 350 is also positioned concentrically within the armature 340. The first clutch module 350 illustrated in FIG. 6 comprises a substantially cylindrical geometry, however, the clutch module 350 may comprise other shapes including, but not limited to, rectangular, discoid, and conical geometries. A surface 352 of the first clutch module 350 is located axially-adjacent to the bushing 346. The first clutch module 350 is rotatable and capable of axial actuation. The first clutch module 350 further comprises a first portion 354 and a second portion 356. The first portion 354 comprises inwardly extending radial splines 358 drivingly engaged with splines on a differential half-shaft (not depicted). The second portion 356 of the first clutch module 350 comprises a set of clutch teeth 366. The second portion 356 of the first clutch module 350 also comprises an annular groove 360 in which is located a biasing member 362. The biasing member 362 may comprise, but is not limited to, a wave spring. A first end 362A of the biasing member 362 abuts and is axially-adjacent to a snap ring 364. The snap ring 364 is axially fixed, and operatively connected to a second clutch module 368.

When the electromagnetic actuator 304 is engaged, the first clutch module 350 clutch teeth 366 mesh with a set of clutch teeth 370 on the second clutch module 368. Additionally, when the first clutch module 350 engages the second clutch module 368, the biasing member 362 is compressed between the first clutch module 350 and the snap ring 364. The second clutch module 368 is axially fixed and comprises a first portion 368A and a second portion 368B, the second portion 368B comprising the clutch teeth 370. The first portion 368A comprises outwardly extending radial splines 372 drivingly engaged with splines (not depicted) on a half-shaft (not depicted) which is driveably connected to a wheel (not depicted). The second clutch module 368 is substantially axially-fixed relative to a housing of, for example, a front drive unit (not depicted) or a power transfer unit via an annular bushing 374 concentrically disposed on an exterior surface of the second portion 368B of the second clutch module 368. The second clutch module 368 illustrated in FIG. 6 comprises a substantially cylindrical geometry, however, the clutch module 368 may comprise other shapes including, but not limited to, rectangular, discoid, and conical geometries.

The first clutch module 350 may comprise, but is not limited to, a unitary module, or an apparatus including the first portion 354 comprising a separable component having a means for driving engagement with the differential half shaft, and the second portion 356 comprising a separable component having a means of driving engagement with the second clutch module 368. The second clutch module 368 may also comprise, but is not limited to, a unitary module, or an apparatus including the first portion 368A comprising a separable component having a means for driving engagement with the half shaft, and the second portion 368B comprising a separable component having a means of driving engagement with the first clutch module 350.

When current from the control unit is directed to the coil 314, thereby engaging the electromagnetic actuator 304, the armature 340 actuates and axially drives the first clutch module 350, compressing the biasing member 362 until the armature 340 projection 340 first surface 342A abuts the interior surface of the housing plate 321 and the first clutch module 350 clutch teeth 366 mesh with the clutch teeth 370 on the second clutch module 368. When the clutch teeth 366 and 370 are engaged, the flow of current to the coil 314 is stopped; the armature 340 remains in the engaged position with projection 340 first surface 342A disposed axially adjacent to the inner surface of the housing plate 321 such that there is no, or only a minimal, magnetic air gap there-between, and the remanent field of the electromagnetic actuator 304 maintains the clutch engagement.

The control unit dissipates the remanent field by performing a degaussing process on the electromagnetic actuator 304 in which the remanent field resides. The degaussing process at least partially dissipates the remanent field from the electromagnetic actuator 304 by applying an alternating current, having decreasing amplitude over time, to the coil 314. An example of the alternating current and the hysteresis curves caused thereby in a degaussing process are described above and illustrated in FIGS. 3 and 4. The degaussing process dissipates the remanent field at least until the biasing member 362 overcomes the force(s) of the remanent field and drives the armature 340 to a disengaged position, thereby disengaging the clutch teeth 366 and 370.

A module is defined here as an isolatable element that has a defined interface with other elements, unless otherwise indicated. Residual magnetism, remanent field, remanence, and uninterrupted magnetic flux may be commonly interchanged herein and define the same characteristic or occurrence, unless otherwise indicated.

While various embodiments of the presently disclosed subject matter have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative—not restrictive.

What is claimed is:

1. A method of disengaging an axle disconnect system, which comprises:
   providing an actuator comprising,
   a coil having a plurality of copper windings,
   a housing at least partially surrounding said coil,
   an armature slideably disposed within said housing and said coil,
   said actuator including a first axial position of said armature,
   said armature including a second axial position of said armature,
   a magnetic circuit comprising at least one of said housing and said armature, and
   applying a current to said coil,
   actuating said armature from said first axial position to said second axial position,
   developing an uninterrupted magnetic flux through said magnetic circuit,
   ceasing flow of said current to said coil,
   permitting said magnetic flux through said magnetic circuit to remain uninterrupted,
   maintaining said armature in said second axial position, and
   applying an alternating current having decreasing amplitude over time to said coil such that said magnetic flux through said magnetic circuit is substantially dissipated.

2. The method of disengaging said axle disconnect system as recited in claim 1, wherein the step of providing said actuator includes,
   providing at least one of said housing and said armature comprising a ferrous material capable of having residual magnetism.

3. The method of disengaging said axle disconnect system as recited in claim 1, wherein the step of applying said current to said coil includes,
   placing said coil in electrical communication with a digital control circuit including power electronics topology, and
   applying said current from said digital control circuit to said coil.

4. The method of disengaging said axle disconnect system as recited in claim 1, wherein the step of providing said actuator includes,
   providing an electrical circuit having,
   a power source,
   a capacitor,
   a resistor in electrical communication with said capacitor and said power source,
   a diode,
   a first switch selectively placing said power source in electrical communication with said coil, and
   a second switch selectively placing said coil in electrical communication with said capacitor, and selectively placing said coil in electrical communication with said diode,
   placing said electrical circuit in electrical communication with said coil.

5. The method of disengaging said axle disconnect system as recited in claim 4, wherein the step of applying said current to said coil includes,
   closing said first switch placing said power source in electrical communication with said coil.

6. The method of disengaging said axle disconnect system as recited in claim 4, wherein the step of ceasing flow of said current to said coil includes,
   closing said second switch placing said coil in electrical communication with said diode, and
   opening said first switch.

7. The method of disengaging said axle disconnect system as recited in claim 4, wherein the step of applying said alternating current having decreasing amplitude over time to said coil includes, closing said second switch placing said capacitor in electrical communication with said coil.

8. The method of disengaging said axle disconnect system as recited in claim 1, wherein the step of providing said actuator includes, providing a first clutch module operatively engaged with said armature, and providing a second clutch module disposed axially adjacent to said first clutch module for selective operative engagement with said first clutch module.

9. The method of disengaging said axle disconnect system as recited in claim 8, wherein the step of actuating said armature from said first axial position to said second axial position includes, driving said first clutch module into operative engagement with said second clutch module.

10. The method of disengaging said axle disconnect system as recited in claim 8, wherein the step of providing said actuator includes, providing a biasing member operatively coupled with said first clutch module and said second clutch module.

11. The method of disengaging said axle disconnect system as recited in claim 10, wherein the step of driving said first clutch module into operative engagement with said second clutch module includes, loading said biasing member, whereby said biasing member is operatively compressed between said first clutch module and said second clutch module.

12. The method of disengaging said axle disconnect system as recited in claim 11, wherein the step of applying said alternating current having decreasing amplitude over time to said coil includes, permitting said biasing member to decompress, thereby operatively disengaging said first clutch module and said second clutch module.

13. The method of disengaging said axle disconnect system as recited in claim 4, wherein the step of providing said electrical circuit includes, providing a third switch in series with said resistor.

14. The method of disengaging said axle disconnect system as recited in claim 13, wherein the step of ceasing flow of said current to said coil includes, closing said second switch placing said coil in electrical communication with said diode, closing said third switch placing said power source in electrical communication with said capacitor, and opening said first switch, whereby said power source charges said capacitor.

15. A method of disengaging an axle disconnect system, which comprises:

providing an actuator comprising,
a coil having a plurality of copper windings,
a housing at least partially surrounding said coil,
an armature slideably disposed within said housing and said coil,
a control unit in electrical communication with said coil,
an electrical circuit, in electrical communication with said control unit, comprising,
a power source,
a capacitor,
a resistor in electrical communication with said capacitor and said power source,
a diode,
a first switch selectively placing said power source in electrical communication with said coil, and
a second switch selectively placing said coil in electrical communication with said capacitor, and selectively placing said coil in electrical communication with said diode,
said actuator including a first axial position of said armature,
said armature including a second axial position of said armature,
a magnetic circuit comprising at least one of said housing and said armature,
a first clutch module operatively engaged with said armature,
a second clutch module disposed axially adjacent to said first clutch module for selective operative engagement with said first clutch module,
a biasing member operatively coupled with said first clutch module and said second clutch module, applying a current to said coil by closing said first switch placing said power source in electrical communication with said coil, actuating said armature from said first axial position to said second axial position, thereby operatively driving said first clutch module into operative engagement with said second clutch module, and loading said biasing member in a compressed state operatively between said first clutch module and said second clutch module, developing an uninterrupted magnetic flux through said magnetic circuit, ceasing flow of said current to said coil by closing said second switch to place said coil in electrical communication with said diode, and opening said first switch, permitting said magnetic flux through said magnetic circuit to remain uninterrupted, maintaining said armature in said second axial position, and closing said second switch placing said capacitor in electrical communication with said coil, thereby applying an alternating current having decreasing amplitude over time to said coil such that said magnetic flux through said magnetic circuit is substantially dissipated, permitting said biasing member to decompress and operatively disengage said first clutch module and said second clutch module.

\* \* \* \* \*